United States Patent
Senecal

(10) Patent No.: US 11,539,697 B1
(45) Date of Patent: Dec. 27, 2022

(54) METHOD FOR CONTROLLING ACCESS TO COMPUTER RESOURCES UTILIZING USER DEVICE FINGERPRINTS

(71) Applicant: Arkose Labs Holdings, Inc, San Francisco, CA (US)

(72) Inventor: David Senecal, Fremont, CA (US)

(73) Assignee: ARKOSE LABS HOLDINGS, INC., San Francisco, CA (US)

( * ) Notice: Subject to any disclaimer, the term of this patent is extended or adjusted under 35 U.S.C. 154(b) by 0 days.

(21) Appl. No.: 17/675,698

(22) Filed: Feb. 18, 2022

(51) Int. Cl.
*G06F 7/04* (2006.01)
*H04L 9/40* (2022.01)

(52) U.S. Cl.
CPC ........ *H04L 63/0876* (2013.01); *H04L 63/102* (2013.01)

(58) Field of Classification Search
CPC .......................... H04L 63/0876; H04L 63/102
USPC .............................................................. 726/4
See application file for complete search history.

(56) References Cited

U.S. PATENT DOCUMENTS

2009/0144806 A1* 6/2009 Gal ...................... H04L 63/083
726/3
2020/0311309 A1* 10/2020 Dawer .................. H04L 9/0825

* cited by examiner

*Primary Examiner* — Tu T Nguyen
(74) *Attorney, Agent, or Firm* — Womble Bond Dickinson (US) LLP

(57) ABSTRACT

A method of determining whether to provide user access to a computer resource may comprise receiving a request for the computer resource from a user device; obtaining, from the user device, an encrypted persistent cookie responsive to determining that the encrypted persistent cookie is present on the user device, wherein the encrypted persistent cookie comprises a fingerprint signature field comprising a previous device fingerprint encoded into the fingerprint signature field as part of a previous session; obtaining, from the user device, an obtained device fingerprint of the user device; comparing the obtained device fingerprint with the previous device fingerprint of the fingerprint signature field to derive a fingerprint variance representing a difference between the obtained device fingerprint and the previous device fingerprint of the fingerprint signature field; and processing the request for the computer resource based on the fingerprint variance.

20 Claims, 10 Drawing Sheets

State Diagram for ACS Response to Received Cookie

500

| Telltale Triggers? | Cookie Invalid? | Replay Detected? | Response |
|---|---|---|---|
| N | N | N | - Suppress Challenge<br>- Reset Cookie to Full TTL Value (max-age=$ttl) |
| Y | N | N | - Suppress Challenge |
| Y | N | Y | - Issue Challenge<br>- Invalidate Cookie (max-age=0) |
| Y | Y | N | - Issue Challenge<br>- Invalidate Cookie (max-age=0) |
| N | At Least One of [Invalid Cookie or Replay] Detected | | If (standard mode)<br>  Suppress Challenge<br>If (strict mode)<br>  Issue Challenge<br>  Invalidate Cookie (max-age=0) |
| ⋮ | ⋮ | ⋮ | ⋮ |

FIG. 5

| ENCODED PERSISTENT COOKIE 602 | | |
|---|---|---|
| name | | (name can be assigned by ACS) |
| TTL | | (default might be 30 days) |
| session_ID | | (might be a 32 byte hex value) |
| Attributes | Secure | (if true, only send cookie on secure requests) |
| | HttpOnly | (if true, cookie cannot be read by script) |
| | Expires | (current time + TTL) |
| | Max-age | (TTL in seconds) |
| | SameSite | (indicates whether limited to same site) |
| | URL | (URL for cookie) |
| | Domain | (domain for which cookie was issued) |
| Encrypted Field | version | (cookie format version) |
| | session_ID | |
| | domain | |
| | timestamp | (epoch when cookie was created) |
| | city | (city associated with IP at cookie creation) |
| | long_lat | (coordinates of IP at cookie creation) |
| | token_ID | (served to client at cookie creation) |
| | device_signature | (user device hashed details at cookie issuance) |
| | browser_ver | (device browser version at cookie issuance) |
| | os_ver | (device OS version at cookie issuance) |
| | state | (state of session evaluation) |
| Other Data | | |

FIG. 6

ACS Replay Detection Configuration Table

| Parameter | Description | Values |
|---|---|---|
| cookie_id_enabled | Enable or disable the cookie based user identification feature | 1 = enabled; 0 = disabled<br>default = 0 |
| cookie_id_mode | Mode for cookie based identification; this can change behavior of the validation process | 1 = standard; 2 = strict<br>default = 1 |
| cookie_id_ttl | Defines the cookie time (in hours) to live value. | default = 720 (30 days) |
| cookie_id_replay_threshold | Defines maximum number of session create requests allowed for a cookie within a given period of time | default = 5 |
| cookie_id_revoke_time | Minimum epoch time for a cookie to be considered valid; any cookie with a lower timestamp will be considered invalid. | no default<br>For example: 1610492071 |
| ... | ... | ... |

FIG. 7

METHOD FOR CONTROLLING ACCESS TO COMPUTER RESOURCES UTILIZING USER DEVICE FINGERPRINTS

FIELD

The present disclosure generally relates to controlling access to computer resources. The disclosure relates more particularly to apparatus and techniques for identifying previously encountered user devices in an access control process.

BACKGROUND

Computer resources are often created for access by others and creators may seek to control access to those computer resources. Where there is a first set of users who are authorized and intended to access those computer resources and a second set of users who may try to access those computer resources but who are unauthorized by the creators and/or operators of those computer resources, the second set of users may use user devices to access those computer resources and get around controls on those computer resources, while it is often desirable to reduce impediments to access to the computer resources by user devices that are determined to be operated by the first set of users. In some situations, the first set of users are human users in the target audience and the second set of users may be unauthorized human users, or automated systems that may overuse the computer resources.

Unauthorized users may include unauthorized human users, users attempting to bypass controls ("bypassers"), and/or unauthorized automated agents. Unauthorized access and/or unwanted access to computer resources may be used to cause damage, such as highly-repetitive access to a computer resource in order to block others from accessing it, causing servers to crash, flooding comment sections with messages, creating a large number of fictitious identities in order to send spam or bypass limits, skewing results of a vote or poll, entering a contest many times, brute force guessing of passwords or decryption keys, or the like.

Some unauthorized access may take the form of pretending to be an authorized user, such as where an authorized user uses one user device for access and an unauthorized user monitors that access and replays part of it to obtain access. While it may be good to block, frustrate, or delay unauthorized users, including those posing as authorized users, it may be undesirable to block, frustrate, or delay authorized users. For example, if an authorized user must constantly solve challenges to prove they are human, that may be unnecessarily frustrating.

There is therefore a need for an improved method and system for providing for user access to computer resources.

BRIEF DESCRIPTION OF THE DRAWINGS

Various embodiments in accordance with the present disclosure will be described with reference to the drawings, in which:

FIG. 5 illustrates logic programming that may be used by the ACS to determine how to respond to a received API request and an encrypted persistent cookie, according to an embodiment.

FIG. 6 illustrates an example data structure of an encrypted persistent cookie, according to an embodiment.

FIG. 7 illustrates a data structure that may be used by the ACS in a replay detection process, according to an embodiment.

DETAILED DESCRIPTION

Figure 1:
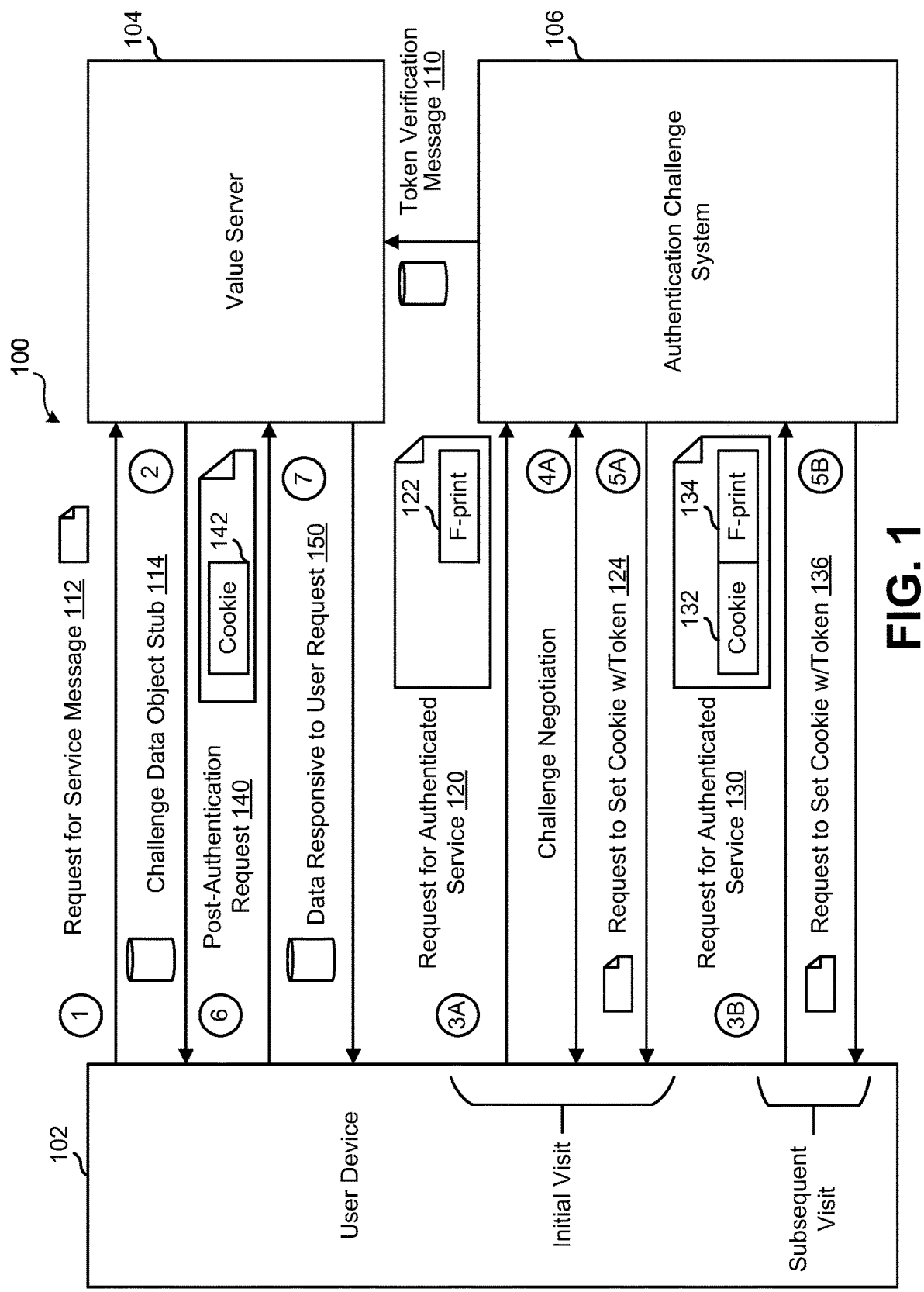
FIG. 1 is a block diagram of an authentication challenge environment and example components, according to an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In some aspects, an access control system as described herein may help reduce challenges issued to authorized users, improve perceived accuracy (such as reducing false positives wherein an authorized user is flagged and/or identified as unauthorized and reducing false negatives wherein an unauthorized user is allowed access as an authorized user), and provide improved end-user experiences. In some examples, a user device is identified across access sessions by providing the user device with a small data object and later requesting that the user device send back that small data object. While examples herein typically referred to that small data object as a "cookie," persistent data objects that may not typically be referred to as cookies may be used instead.

In examples herein, once a user device is deemed to be operated by an authorized user, an access control server or a content server may provide that user device with a persistent cookie. In a subsequent session, that user device sends the persistent cookie, the access control server content server evaluates it to determine whether to accept the user device as an authorized user device in the subsequent session. The persistent cookie may include a field, encrypted or not, that identifies the user device as an authorized user device and may include a fingerprint signature field, wherein the fingerprint signature field corresponds to a prior-received fingerprint of the user device encoded into the fingerprint signature field prior to providing the encrypted persistent cookie to the user device. In a subsequent session, if the user device provides the encrypted persistent cookie, an access control server or the content server may compare the obtained device fingerprint with the fingerprint signature field to derive fingerprint variances if any. All of some of the encrypted persistent cookie is encrypted or encoded in a manner that may make it difficult for an observer of the encrypted persistent cookie on its own to be able to modify or reconstruct the encrypted persistent cookie differently in a way that such a modified cookie may be treated as being valid.

If the difference between the user device fingerprint when the encrypted persistent cookie was created and the user device fingerprint when the encrypted persistent cookie was subsequently submitted to the authentication server is such that the differences are considered normal (e.g., a slight increase in an operating system version number may be considered normal as user devices often get operating system updates), the cookie may be accepted and the user device deemed to be an authorized user device without the need for further authentication of the user, while differences considered abnormal (e.g., a huge geographic change of the user device and an unusual change in version numbers, browser settings, etc.) may trigger a challenge process. If a legitimate user changes their user device usage such that the change is considered unusual, they may not be blocked from access to authorized computer resources but may be subject to a simple challenge process before being provided access to computer resources.

FIG. 1 is a block diagram of an authentication challenge environment 100 and example components, such as a user device 102, a value server 104, and an authentication challenge system 106. Messages and data objects that are passed among components are shown and explained in greater detail with reference to other figures. User device 102 may attempt to access value server 104 that may provide computer resources to user devices, such as a web server providing HTML or other web content to user devices running web browsers. User device 102 may be a device used by an authorized user or an unauthorized user wherein, preferably, value server 104 may provide an authorized user with services and not provide an unauthorized user with services. User device 102 may be a user device known to authentication challenge system 106 or may be a user device as yet unknown to authentication challenge system 106.

FIG. 1 illustrates indicators of a typical order of steps of communications among user device 102, value server 104, and an authentication challenge system 106, using alphanumeric characters in circles. It should be noted that other orders of steps taken may vary and some steps may be omitted or added. In a precursor step, authentication challenge system 106 may supply value server 104 information usable by value server 104 for handling challenges and user device authentication.

In an operational process illustrated, user device 102 sends a request for service message 112 to value server 104 (referenced as communication "1"). An example may be where user device 102 is running a browser or mobile app and sends a request for a web page that is protected by authentication challenge system 106. Value server 104 may determine whether a challenge is needed. If value server 104 determines that a challenge is needed, value server 104 sends (communication 2) a challenge data object (C.D.O.) stub 114 to user device 102.

In some embodiments, C.D.O. stub 114 comprises program code and in some embodiments, the C.D.O. stub 114 comprises a redirect instruction instructing user device 102 to redirect its request to authentication challenge system 106. In some embodiments, what is sent is an entire C.D.O. as explained herein elsewhere. In some embodiments, as explained herein elsewhere, C.D.O. stub 114 may include information about the user or the request and such information may be encrypted or signed such that user device 102 cannot easily alter the information without that alteration being detected. Such information may include details about the user that are known to value server 104, such as an IP address associated with the request, country of origin of the request, past history of the user, if known, etc.

Authentication challenge system 106 may include (not shown in FIG. 1) a code server, a user evaluator, a challenge generator, a response evaluator, and cookie and user state storage. In negotiating with user device 102, authentication challenge system 106 may determine that user device 102 should be deemed an authorized device and send it a persistent cookie.

For an initial visit, wherein user device 102 does not have a persistent cookie for authentication, or otherwise, user device 102 will send a request for authenticated service 120 (communication 3A) that includes a fingerprint 122 of user device 102. Fingerprint 122 may be a fingerprint representing user device 102 configuration details that may be typically included in an HTTP request. Once authentication challenge system 106 receives request for authenticated service 120, it may start a challenge negotiation (communication 4A) with user device 102. In some instances, authentication challenge system 106 may determine, though other means, that user device 102 is an authorized device and omit one or more steps of the challenge negotiation, despite user device 102 not supplying a persistent cookie in request for authenticated service 120. In some instances, authentication challenge system 106 may determine, though other means, that user device 102 is a bot, some unauthorized device, and/or a hacking device and may not proceed with the challenge negotiation despite request for authenticated service 120.

If user device 102 succeeds in the challenge negotiation, authentication challenge system 106 may send user device 102 a request to set a persistent cookie, which may be an encrypted persistent cookie 124 including a token for use by value server 104 and an encrypted representation of all or portions of fingerprint 122 (communication 5A). User device 102 may then supply that token as token 142 in a post-authentication request 140 to value server 104 (communication 6). In response, value server 104 may validate token 142 and if valid, supply data 150 (communication 7) responsive to the original user request (that of request for service message 112). In some embodiments, to validate the token 142, the value server 104 may provide the token 142 to the authentication challenge system 106, which may respond with token verification message 110. In some embodiments, communication 6 may be in the form of a callback to value server 104.

For a subsequent visit, user device 102 may have the persistent cookie for authentication and following communication 2, user device 102 will send a request for authenticated service 130 (communication 3B) that includes an encrypted persistent cookie 132 and a fingerprint 134 of user device 102. Encrypted persistent cookie 132 may include, in a form not easily altered without detection, a representation of fingerprint 122 that was previously supplied by authentication challenge system 106. Authentication challenge system 106 may then determine whether to engage in a challenge, such as in the case where the fingerprint 134 appears to be altered, where the interaction with user device 102 is untrusted in some way, or where a stored copy of fingerprint 122 stored by authentication challenge system 106 appears to be inconsistent with the fingerprint 134 provided to authentication challenge system 106 by user device 102 in communication 3B. In some cases, after the passage of a certain amount of time since a last interaction with user device 102, authentication challenge system 106 may challenge a user device 102 regardless of other states.

If challenged, and user device 102 succeeds in the challenge negotiation, authentication challenge system 106 may then send user device 102 a request to set a persistent cookie along with a token 136 for use by value server 104 (communication 5B). User device 102 may then supply token 136 as token 142 in post-authentication request 140 to value server 104 (communication 6) and have value server 104 validate the token, as in a case similar to the initial visit.

While just one challenge process was described in detail, it should be understood that value server 104 may process many requests in parallel and interact with more than one authentication challenge system and authentication challenge system 106 may process requests from many user devices in parallel and interact with many value servers. Value server 104 may determine its next step.

In a typical process, all of the processing may be done in a time period similar to a time period normally required for processing service requests. In another variation, the value server 104 does not handle any authentication and may not even be aware it is happening. This may be useful for securing legacy systems. In such a system, the authentication process may be performed by an authentication controller that operates between user devices and the value server. An authentication challenge system and an authentication controller may together operate to control access of user devices to the value server 104. Examples of value servers 104 may include a web server of a customer of an authentication challenge system operator 104.

Figure 2:
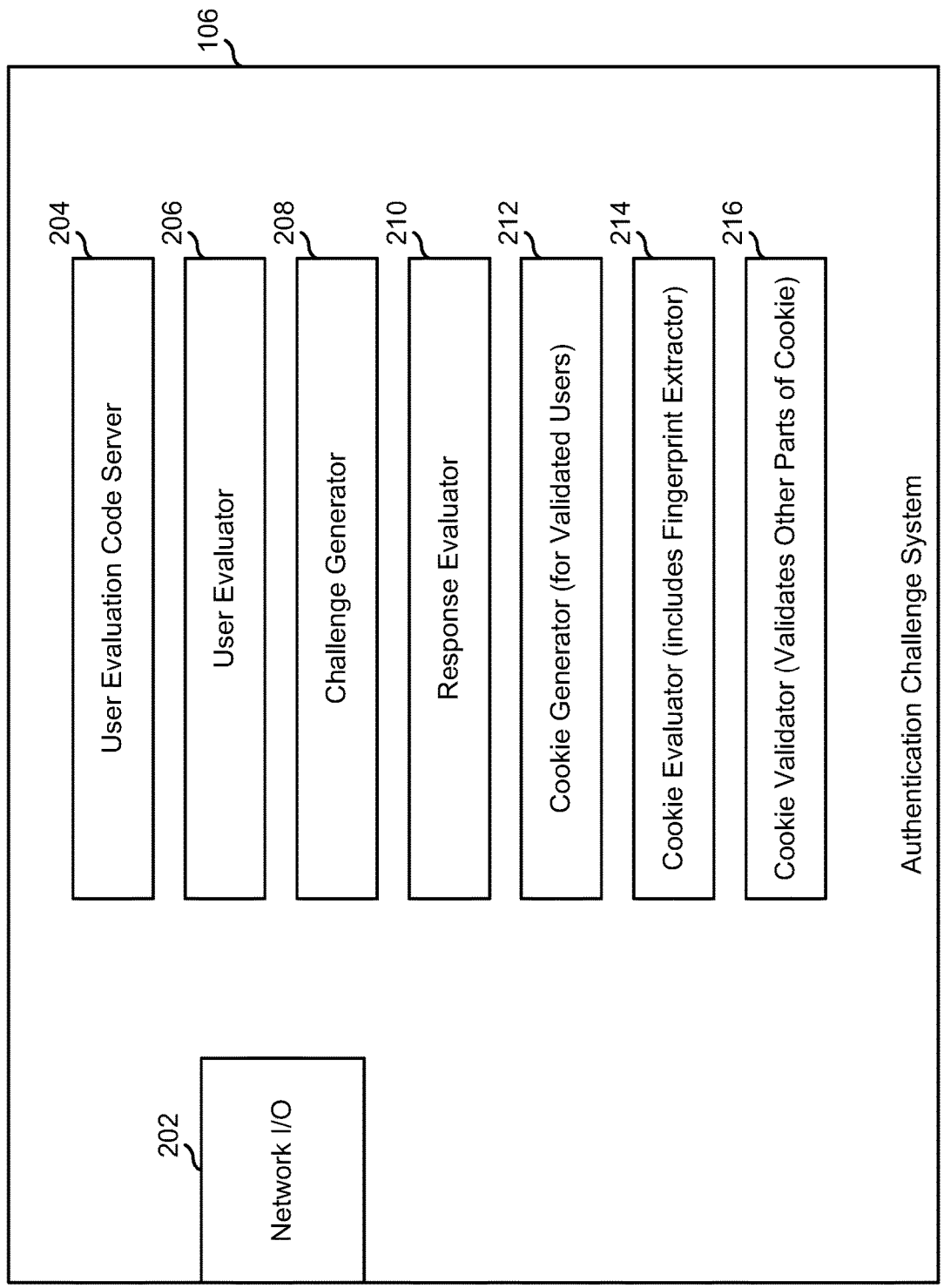
FIG. 2 is a block diagram of an authentication challenge system, according to an embodiment.

FIG. 2 is a block diagram of an authentication challenge system 106, according to an embodiment. As illustrated there, authentication challenge system 106 comprises a network interface 202, a user evaluation code server 204, a user evaluator 206, a challenge generator 208, a response evaluator 210, a cookie generator 212, a cookie evaluator 214, and a cookie validator 216. Network interface 202 may be used for communications to and from one or more value servers (e.g., value server 104 of FIG. 1) and one or more user devices (e.g., user device 102 of FIG. 1). User evaluation code server 204 may provide a value server with a code snippet that the value server may provide to a user device to initiate a process described herein. User evaluation code server 204 may also provide user devices with scripts and other assets. In some variations, functionality of a user evaluation code server is provided by a content delivery network.

User evaluator 206 may evaluate inputs from a user device, such as a fingerprint provided by a user device, telemetry data, HTTP headers, etc. User evaluator 206 may also use other inputs, such as personally identifiable (PII) data, in evaluating a user of a user device. Challenge generator 208 may be used to create a challenge data object (C.D.O.) that may comprise a puzzle for the user to solve, allowable answers, and other details associated with a challenge. Non-limiting examples of C.D.O. configurations and challenges/puzzles are described in U.S. patent application Ser. No. 17/208,491, the entire contents of which are incorporated by reference herein. Response evaluator 210 may be used to evaluate a challenge response received from a user device and determine whether the challenge response successfully responded to the challenge. Cookie generator 212 may generate an encrypted persistent cookie in response to a successful challenge or an invalidating cookie in response to an unsuccessful challenge.

User evaluator 206, challenge generator 208, response evaluator 210, and cookie generator 212 may be used in an initial challenge negotiation (e.g., communication 3A in FIG. 1) in which a user device first obtains an encrypted persistent cookie. In a subsequent challenge negotiation (e.g., communication 3B in FIG. 1), a user device provides a copy of the encrypted persistent cookie it received in a previous negotiation and in such cases, cookie evaluator 214 may decrypt an encrypted field of the cookie to determine whether the encrypted field is valid, and to extract a user device fingerprint from the encrypted persistent cookie. Cookie validator 216 may evaluate the encrypted persistent cookie for validity, such as checking its time-to-live (TTL) value and determining that the encrypted persistent cookie is used consistently with the attributes of that cookie.

Figure 3A:
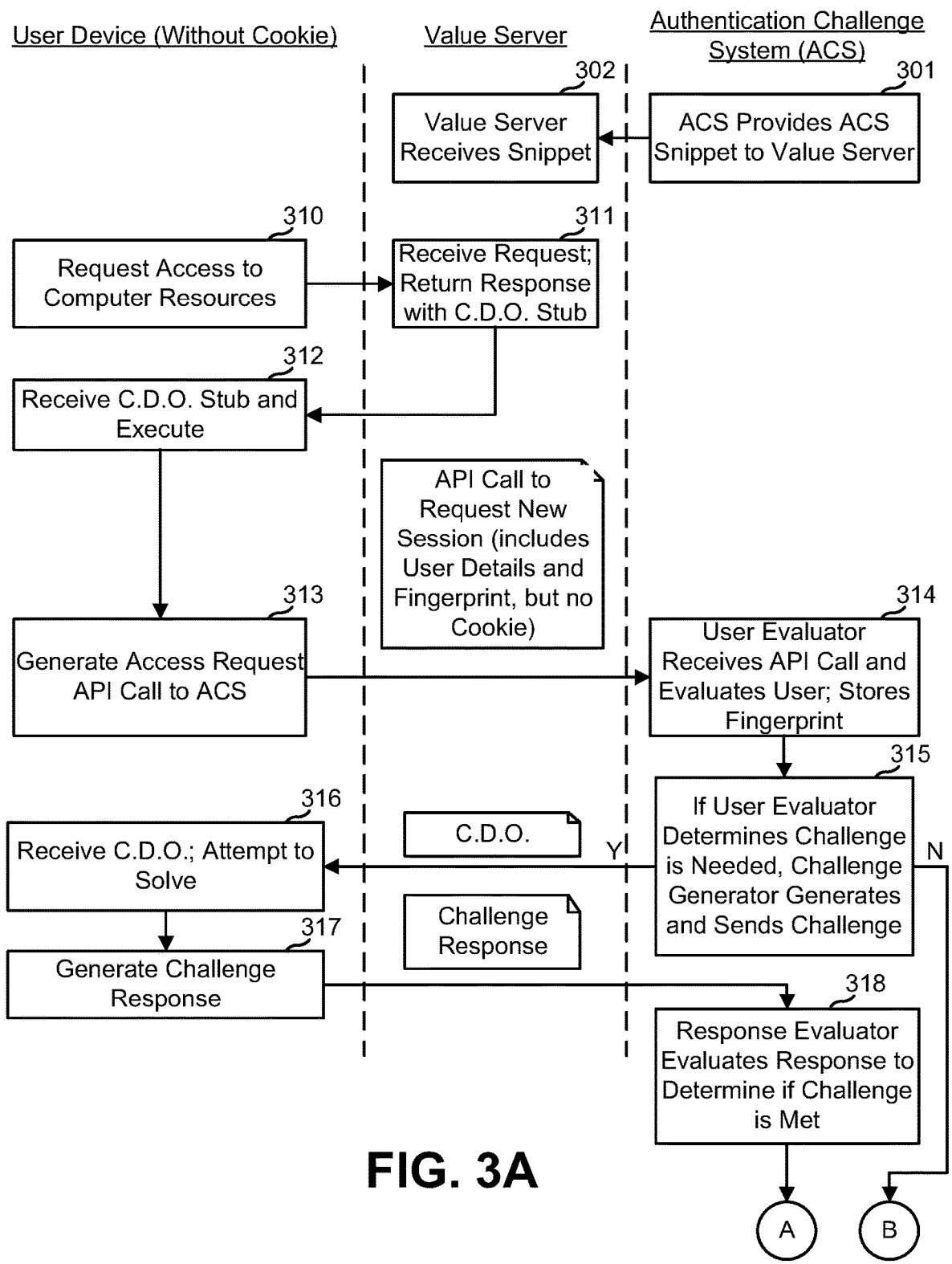
FIG. 3 comprises FIG. 3A and FIG. 3B and is a swim diagram of interactions between elements depicted in FIG. 1 and FIG. 2, according to an embodiment.
Figure 3B:
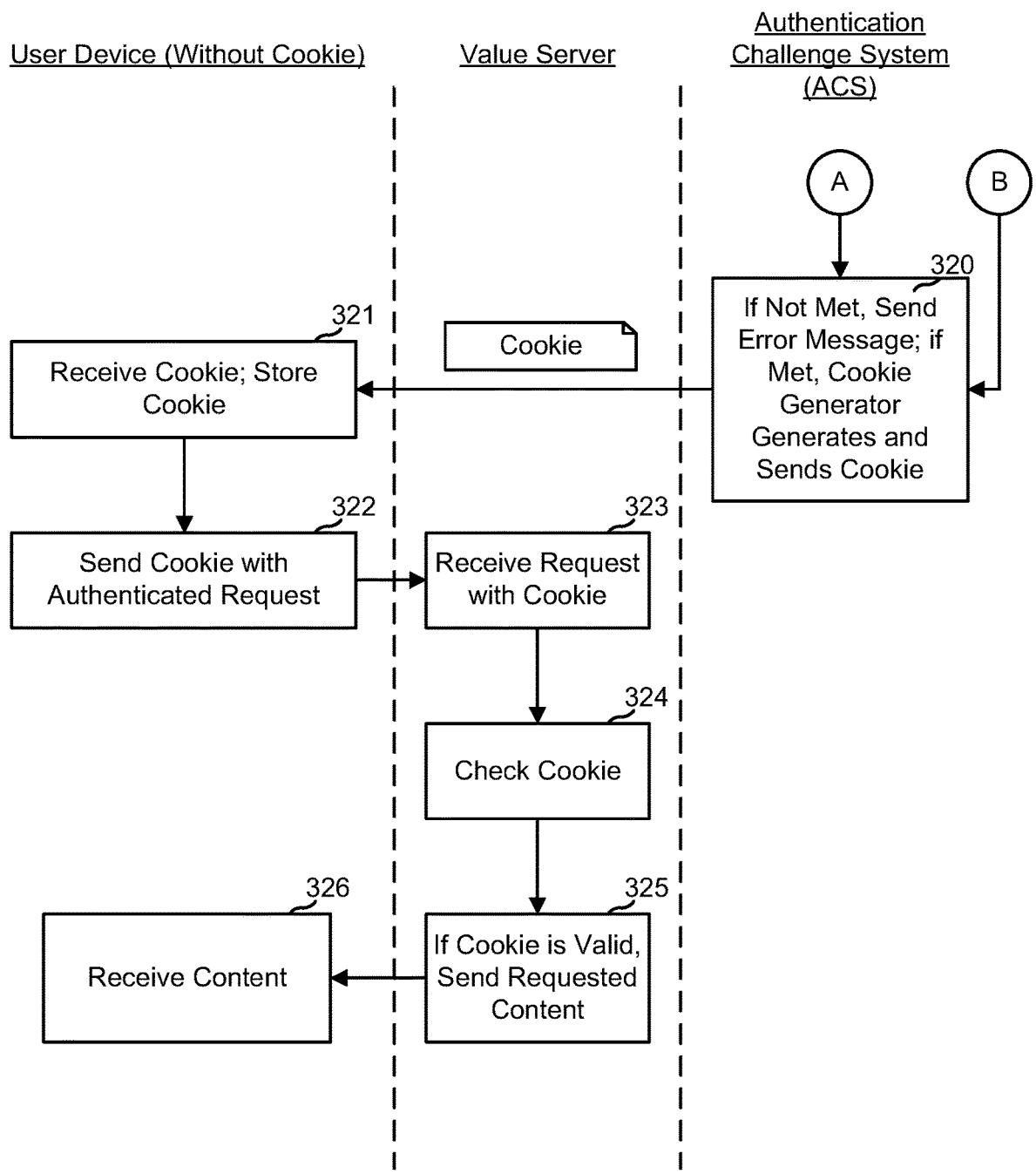

FIG. 3 comprises FIG. 3A and FIG. 3B and is a swim diagram of interactions between elements depicted in FIG. 1 and FIG. 2. Other steps, processes, and interactions may occur among the components shown, but for clarity not all possible interactions are illustrated in FIG. 3. In FIG. 3, the interactions are between a user device, a value server, and an authentication challenge system (ACS) where the user device is in a state of not having an encrypted persistent cookie or where the user device will not be presenting an encrypted persistent cookie.

When a user interacts with a protected site and no cookie was previously set on the user device, the user device may load a protected page that triggers the loading of a script (e.g., executable code) that collects device and browser characteristics as well as behavior biometric data. The data collected may be sent to the ACS as user data in a "session create" API call. The ACS may evaluate the provided data against various detection methods (telltales, security credit, rate-limiting, IP intelligence, device intelligence, etc.). If no threat is found in the data collected, a cookie may be issued and/or transmitted to the user device and otherwise, a challenge is issued and/or transmitted to the user of the user device. If the answer to the challenge is correct, a cookie is issued and/or transmitted to the user device, otherwise the cookie is reset/invalidated, and a new challenge may be issued and/or transmitted with an increase in security level.

As shown in FIG. 3A, at step 301, the ACS provides an ACS snippet to the value server and at step 302, the value server receives the snippet and stores it for later use. In a process that begins at step 310, the user device requests access to computer resources, and the value server at step 311 receives the request and returns a response with a challenge data object (C.D.O.) stub formed based on the snippet earlier provided by the ACS. At step 312, the user device receives the stub and executes it, resulting in the user device generating an access request API call to the ACS at step 313. The API call may include user details and user device fingerprint data. At step 314, the ACS receives the API call and evaluates the user, as well as storing a user device fingerprint.

At step 315, if the user evaluator determines a challenge is needed, a challenge generator of the ACS generates a challenge and sends the corresponding challenge data object to the user device. At step 316, the user device receives the challenge data object and attempts to solve it with user input, and at step 317 generates a challenge response and sends it to the ACS. At step 318, a response evaluator of the ACS evaluates the response to determine if the challenge is met. The flow then proceeds to label "A" and the process continues as shown in FIG. 3B. However, if at step 315 the user evaluator determines a challenge is not needed, the flow then proceeds to label "B" and the process continues as shown in FIG. 3B.

Referring now to FIG. 3B, at step 320, if the challenge was not met, the ACS sends an error message and possibly also an invalidating encrypted persistent cookie. However, if the challenge is met, a cookie generator generates and sends a valid, unexpired encrypted persistent cookie. At step 321, the user device receives the cookie and stores the cookie so that it can, at step 322, later send the cookie with an authenticated request to the value server. At step 323, the value server receives the request with the cookie, in step 324 checks the cookie, and in step 325, if the cookie is valid, the value server sends the requested content. At step 326, the user device receives the content and that may be the end of the interaction.

Figure 4:
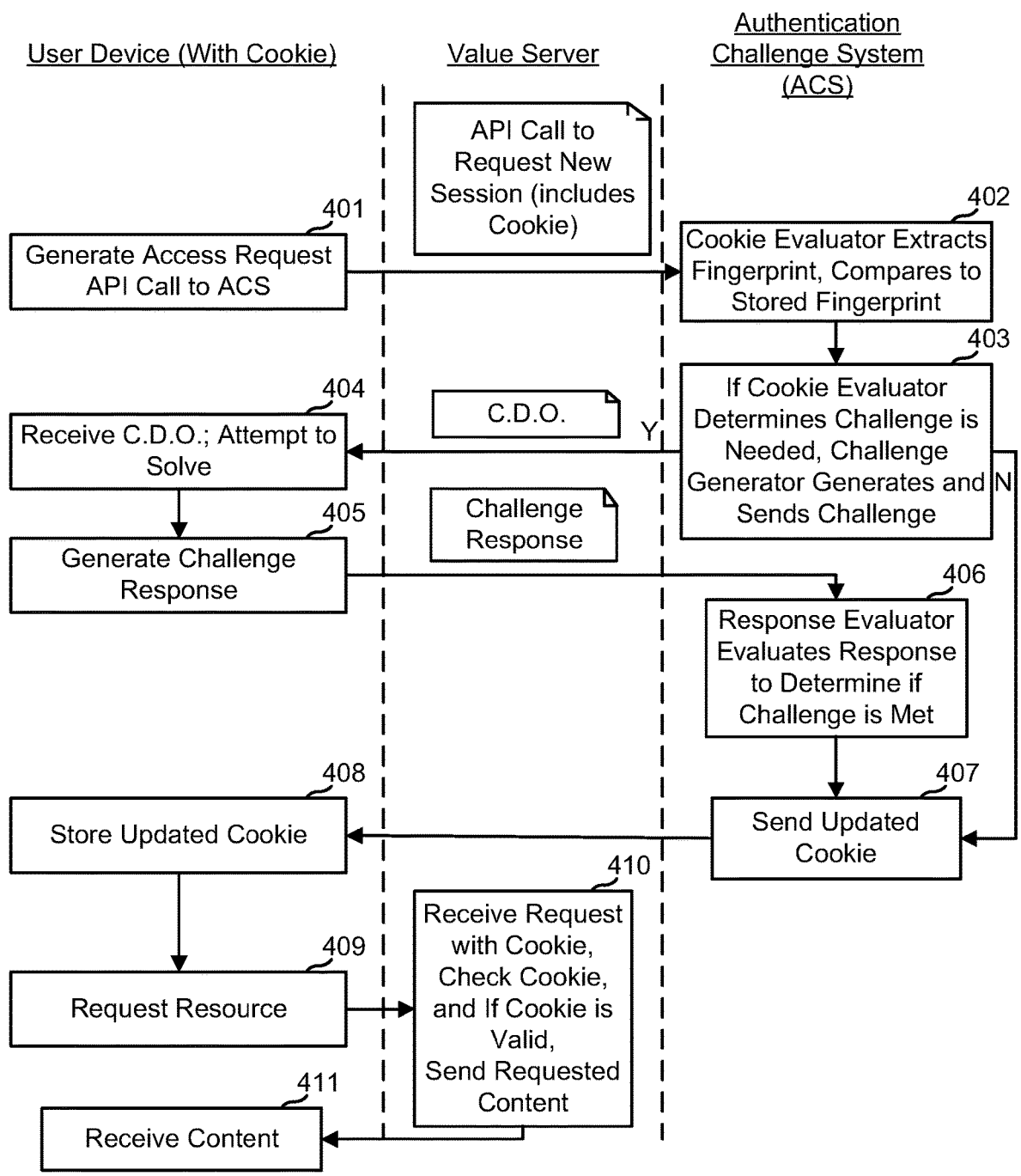
FIG. 4 is a swim diagram of interactions between elements depicted in FIG. 1 and FIG. 2 in a subsequent interaction, according to an embodiment.

FIG. 4 is a swim diagram of interactions between elements depicted in FIG. 1 and FIG. 2 in a subsequent interaction. The subsequent interaction may occur with a user device that has a valid encrypted persistent cookie. At step 401, the user device generates an access request API call to the ACS and the API call requests a new session. The API call includes the encrypted persistent cookie that the user device previously stored. If the user device provides a cookie on subsequent requests to a protected endpoint, the ACS may determine that the encrypted persistent cookie is present and will validate the cookie and detect cookie replay. If no anomaly is found when validating the cookie and no telltale triggered on the request, the ACS may forgo a challenge.

At step 402, a cookie evaluator of the ACS extracts the fingerprint from the encrypted persistent cookie and compares the fingerprint to the stored fingerprint associated with that user device. The comparison may not require an exact match, as the cookie evaluator may refer to a stored set of rules indicating which differences or variances between fingerprints are deemed indicative of normal user device changes and which are deemed indicative of possible cookie stuffing or attempts at unauthorized access, allowing the former and blocking the latter.

At step 403, if the ACS cookie evaluator determines a challenge is needed, a challenge generator generates and sends a challenge data object to the user device. At step 404, the user device receives the challenge data object and attempts to solve the challenge encoded in the challenge data object. At step 405, the user device generates a challenge response and sends it to the ACS. At step 406, a response evaluator of the ACS evaluates the response to determine if a challenge is met and proceeds to step 407. On the other hand, if at step 403, the cookie evaluator determines a challenge is not needed, the process flows directly to step 407 without issuing a challenge. In some variations, challenges are regularly generated and sent and bypassing the challenge process comprises suppressing a challenge that may otherwise be sent.

At step 407, the ACS sends an updated cookie to the user device, possibly updating the TTL value to extend the validity of the cookie. At step 408, user device stores the updated cookie and at step 409 uses the updated cookie to request resources from the value server. At step 410, the value server receives the request with the cookie, checks the cookie, and if the cookie is valid, sends the requested content to the user device. The flow ends at step 411, where the user device receives the content. Additional interactions may occur between the user device and the value server as the user device has been validated at that point.

At the ACS, when receiving a "session create" request, the ACS may get the settings for the cookie validation process for the key, may extract the fingerprint from the incoming request and may make a call to a device intelligence API to evaluate the fingerprint and get the device intel signature and the suspicious flag, then make a call to an IP intelligence API to retrieve the geolocation, network, and reputation data associated with the user device. If the cookie is indicated as being an encrypted persistent cookie, the ACS may decrypt the cookie and extract the session ID, a cookie_clear_ID, a cookie_encrypt_ID, a state cookie_state, a domain cookie_domain, a timestamp cookie_timestamp, a device intelligence signature cookie_device_intel_sig, a browser version value cookie_browser, and an operating system version value cookie_os, as well as geolocation data cookie_city and cookie_long_lat.

If the cookie state is equal to challenge_served, indicating that the user did not complete a previous challenge, the cookie may be ignored by the ACS and treated as an initial cookie request. If a cookie state is equal to transparent_completed or challenge_completed, the ACS may then validate the session ID, such as checking that the cookie_clear_ID value in the cleartext of the cookie exactly matches to the cookie_encrypt_ID value in the encrypted subfields, as a different value may indicate an attempt to tamper with the cookie. Other validations may be done, such as validating the domain, the age of the cookie, checking the timestamp against a cookie revocation time cookie_ID_revoke_time, etc. The ACS may also assess the device intel signature and if a value of a variable device_intel_sig is different than a variable cookie_device_intel_sig, the ACS may flag and/or identify that the request as anomalous and may be a telltale trigger.

The rule set may be that if the cookie_browser (e.g., a browser of the device) brand and version differ from the current request browser brand and version by two versions or less, it may be considered as a minor anomaly, but if the browser brand is different, this may be considered a major anomaly. Similar comparisons for a cookie_os (e.g., an operating system of the device) variable may be done.

As for assessing the IP intel, a fraud score associated with the IP address of the current request may be considered and if above a threshold value, it may be considered as a major anomaly. Similarly, city and coordinates checking may have thresholds for proximity. For example, if the city is different, and the distance between the user current location and the coordinates when the cookie was created are greater than some threshold, it may be considered as a medium anomaly. For cookie replay assessment, the ACS may consider whether cookie replay occurred and a cookie replay may be considered a major anomaly.

FIG. 5 illustrates logic programming that may be used by the ACS to determine how to respond to a received API request and an encrypted persistent cookie. While a few specific examples are shown, it should be understood that other rule sets may be deployed. In the rule set 500 depicted, which may be stored as structured data accessible to the ACS, the conditions considered are (1) whether telltale triggers are present, (2) whether the cookie is determined to be valid or invalid, and (1) whether a cookie replay is detected.

The fingerprint is generated based on user device configuration provided in an initial session or a subsequent session and this user device configuration is part of the fingerprint. By encrypting the fingerprint, even though it may have subfields that are also part of the cookie in cleartext, altering the fingerprint by unauthorized parties may be made more difficult. The cookie may be persistent and valid for a configurable period of time (e.g., 7 days, 30 days, or some other time period). When a user returns to a site of a value server and a cookie is included in the request, the cookie may be validated against the information found in the fingerprint. If anomalies are found during the validation process, the user may be re-challenged. Otherwise, the challenge may be suppressed. In order to prevent abuse with the cookie such as cookie harvesting and replay, a replay detection mechanism may be used.

In the example shown, if no telltale triggers are detected, the cookie is determined to be valid, and a replay is not detected, the ACS response is to suppress a challenge or forgo sending a challenge, and the ACS sends the user device an instruction to set a cookie. The cookie may be an encrypted persistent cookie having a full value for its TTL (time-to-live) field. If instead some telltale triggers are detected, but the cookie is valid and replays are not detected, then the ACS will forego a challenge, but will not resend the cookie and it will expire when it was originally set to expire.

If telltale triggers are detected and the cookie is invalid but a replay is not detected, or if a replay is detected but the cookie is valid, the ACS will issue and/or transmit a challenge and will send a request to set a cookie that is an expired cookie, thereby invalidating the earlier cookie. In the case where there are no telltale triggers but the cookie is invalid and/or a replay is detected, the ACS looks to a security setting that may be stored in memory accessible by the ACS. If the security setting indicates that the ACS should operate in a standard mode, the lack of telltale triggers is sufficient to suppress or forego a challenge. However, where the security setting is set to a strict mode, the presence of telltale triggers and at least one of an invalid cookie or a detected replay may cause the ACS to invalidate the cookie and issue and/or transmit a challenge. Other combinations of requirements and responses may be included as well.

FIG. 6 illustrates an example data structure of an encrypted persistent cookie 602. Other variations are possible, but in the format shown, encrypted persistent cookie 602 has fields for name, TTL, session_ID, attributes, an encrypted field, and possibly other data. A cookie value may include the session_ID and an encrypted value of various subfields and, in some embodiments, may be formed as session_id~ENC(AES256[version; session_id; domain; timestamp; country; long_lat; token_id; device_signature; browser; os; state).

The attributes subfields may be as shown, where the "Secure" attribute is set to "true" to indicate that the cookie should only be sent on a secure request, the "HttpOnly" attribute is set to "true" to indicate that the cookie should not be readable by scripts, such as JavaScript code. The attributes may also include an expiration time, a maximum age (e.g., TTL in seconds, a "SameSite" attribute that when "true" limits cookies from being sent to other domains, a URL for the cookie (e.g., "/"), and a domain name associated with the value server (which may be a customer server of a customer of the ACS service).

The session_ID value may be a randomly generated 32-byte hexadecimal value to distinguish from other sessions. To reduce session_ID collisions, the session_ID value may be generated using an MD5 hash such as an MD5 hash of (IP address+epoch_time+domain+token_ID).

Within the encrypted value, which as explained above, a cookie evaluator may decrypt, the subfields may include a version number, which may help with backward compatibility, the session_ID, a domain for which the cookie was issued, a timestamp of the epoch when the cookie is created, a city label indicating a city associated with the IP address of the user device during cookie creation, geographic coordinates (e.g., longitude, latitude) associated with the IP address of the user device during cookie creation, a TokenID subfield that was served to the user device when the cookie was created, a device_signature subfield that may be the MD5 hash value returned by a device intelligence API when the persistent cookie was issued, a browser brand and version used when the persistent cookie was issued, an OS subfield indicating the operating system and version used when the persistent cookie was issued, and a state of session evaluation.

Examples of states of session evaluation may include:
(a) transparent_completed: the user device/client was classified as non-suspicious through a transparent mode (challenge was suppressed);
(b) challenge_served: the ACS in transparent mode detected an anomaly and the session was challenged; and
(c) challenge_completed: A challenge was issued and the user successfully completed the challenge.

A replay detection process by the ACS may have a replay threshold that varies depending on the use case and may be configurable on a per-key basis through the setting a threshold.

The cookie structure shown in FIG. 6 may be useful for various purposes described herein. For example, because the encrypted value is not easily altered and it includes fields representing user device state as provided by a user device when the cookie was created, and because user device state is provided with a cookie in a later session, the user device states may be compared as between those two times and the differences examined to determine whether they are likely to be due to ordinary changes in user device state or are likely due to the cookie being moved or copied from one user device (a previously seen authorized device) to another user device (an unseen and likely unauthorized device).

FIG. 7 illustrates a data structure that may be used by the ACS in a replay detection process. As illustrated there, the ACS may be configurable based on configuration variables that are part of a table labelled "ACS Replay Detection Configuration Table". Example values and defaults are shown, but other values could be used. Other thresholds may be used for a replay threshold depending on the value being requested from the value server. For example, where the interaction seeks to take over a login of an account, starting a new account origination, adding items to a checkout cart, or posting a review, there may be a limit of two uses of the cookie per hour (or other predetermined time period), a gift card purchase may be acceptable with three uses of the cookie per hour, web scraping (such as for flight data, pricing, search results, etc.) with ten uses of the cookie per hour, etc. The count (number of requests seen from a session for a given key) may be maintained in a state database accessible to the ACS.

If the number of requests to the session_create API with the same cookie value exceeds the threshold, a cookie replay may be logged for later consideration. Cookie-based user identification may be enabled or disabled (cookie_id_enabled). A TTL for a cookie may be defined (cookie_id_ttl) that defines for how long the cookie is valid.

The cookie ID replay threshold (cookie_id_replay_threshold) may define a maximum (threshold) number of times a request of a session create API message may be accepted within a defined time period and the ACS may suppress a challenge if conditions are met. The revocation time (cookie_id_revoke_time) may help proactively clear all session cookies in case of widespread abuse such as cookie replaying is detected. Any cookie with a lower timestamp may be considered invalid (i.e., cookies issued earlier in time than the time indicated are all revoked). This may mean that many users may have to readdress a challenge, but that may be a minor task and/or an acceptable result.

Figure 8:
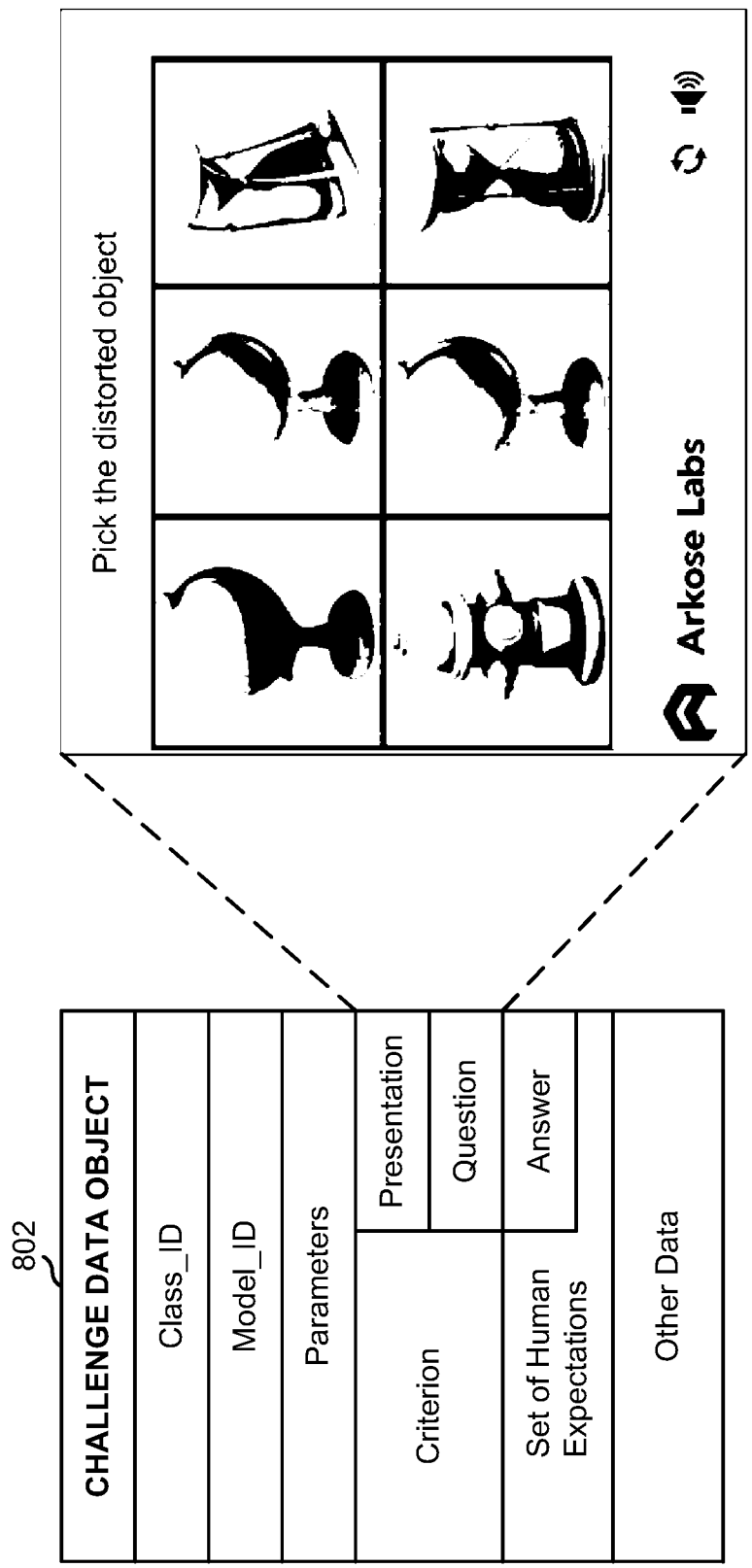
FIG. 8 illustrates an example of a data structure for a challenge data object.

FIG. 8 illustrates an example of a data structure for a challenge data object 802. Challenge data object 802 is shown including various fields including a presentation and a question, wherein the question is a challenge for the user and a correct answer may tend to indicate a human authorized user rather than an automated process or unauthorized user.

Figure 9:
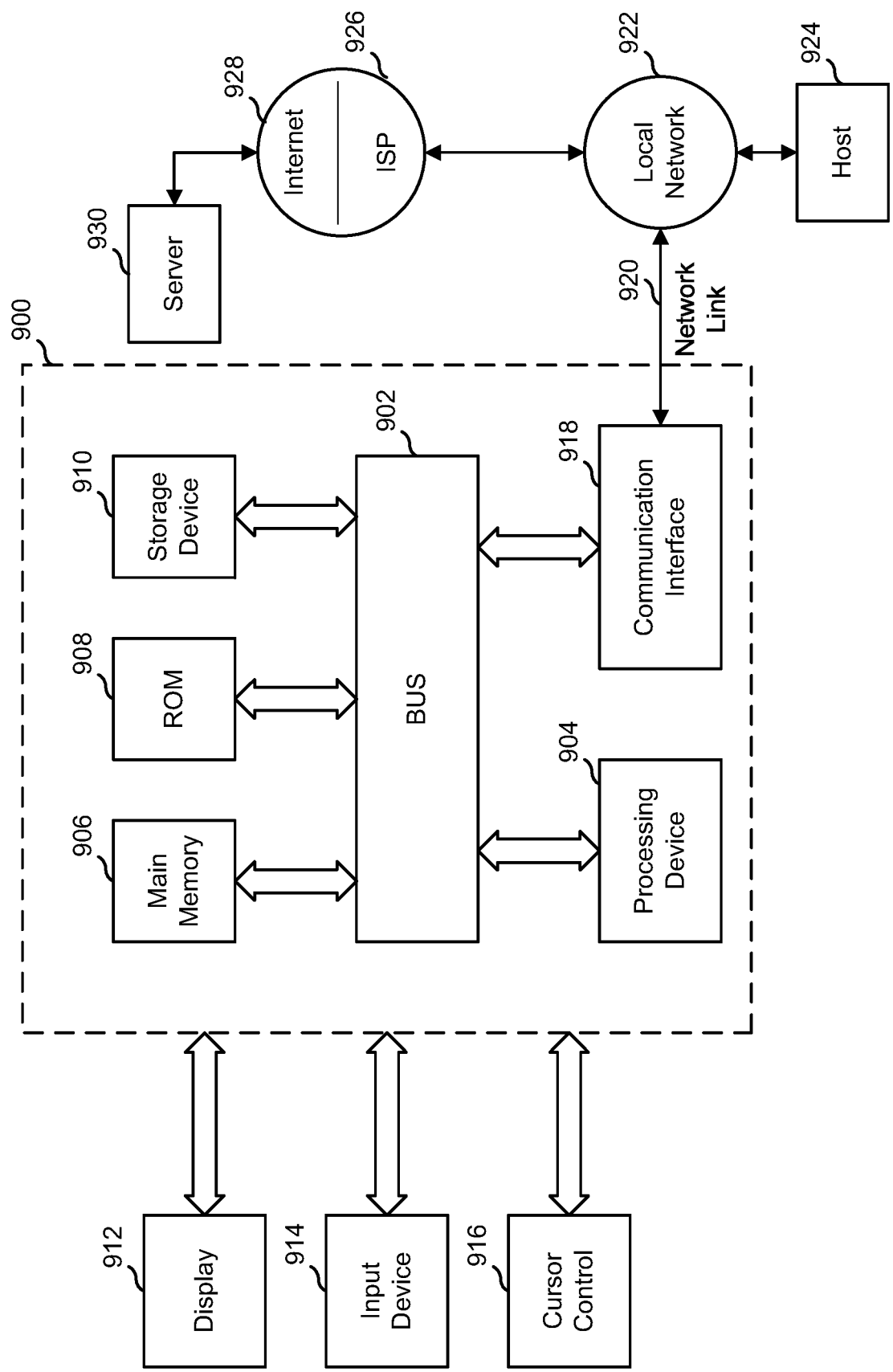
FIG. 9 is a block diagram illustrating an example computer system upon which the systems illustrated in FIGS. 1 to 8 may be implemented, according to various embodiments.

Operations may be implemented by software executing on one or more computer systems (e.g., each like a computer system 900 illustrated in FIG. 9). Data structures that may be present in memory or storage accessible to computer processing devices. In some embodiments, the data structures are used by various components and tools, some of which are described in more detail herein. The data structures and program code used to operate on the data structures may be provided and/or carried by a transitory computer readable medium, e.g., a transmission medium such as in the form of a signal transmitted over a network.

According to some embodiments, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

One embodiment may include a carrier medium carrying data that includes data having been processed by the methods described herein. The carrier medium may comprise any medium suitable for carrying the data, including a storage medium, e.g., solid-state memory, an optical disk or a magnetic disk, or a transient medium, e.g., a signal carrying the data such as a signal transmitted over a network, a digital signal, a radio frequency signal, an acoustic signal, an optical signal or an electrical signal.

FIG. 9 is a block diagram that illustrates a computer system 900 upon which the computer systems of the systems described herein and/or data structures shown elsewhere herein may be implemented. Computer system 900 includes a bus 902 or other communication mechanism for communicating information, and a processing device 904 coupled with bus 902 for processing information. Processing device 904 may be provided by one or more general-purpose processing devices such as a microprocessor, central processing unit, or the like. In an illustrative example, processing device 904 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 904 may also include one or more special-purpose processing devices such as an application specific integrated circuit (ASIC), a field programmable gate array (FPGA), a digital signal processor (DSP), network processor, or the like. The processing device 904 may execute the operations described herein, in accordance with one or more aspects of the present disclosure, for performing the operations and steps discussed herein. In some embodiments, processing device 904 may be a plurality of processing devices 904.

Computer system 900 also includes a main memory 906, such as a random-access memory (RAM) or other dynamic storage device, coupled to bus 902 for storing information and instructions to be executed by processing device 904. Main memory 906 may also be used for storing temporary variables or other intermediate information during execution of instructions to be executed by processing device 904. Such instructions, when stored in non-transitory storage media accessible to processing device 904, render computer system 900 into a special-purpose machine that is customized to perform the operations specified in the instructions.

Computer system 900 further includes a read only memory (ROM) 908 or other static storage device coupled to bus 902 for storing static information and instructions for processing device 904. A storage device 910, such as a magnetic disk or optical disk, is provided and coupled to bus 902 for storing information and instructions.

Computer system 900 may be coupled via bus 902 to a display 912, such as a computer monitor, for displaying information to a computer user. An input device 914, including alphanumeric and other keys, is coupled to bus 902 for communicating information and command selections to processing device 904. Another type of user input device is a cursor control 916, such as a mouse, a trackball, or cursor direction keys for communicating direction information and command selections to processing device 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processing device 904 executing one or more sequences of one or more instructions contained in main memory 906. Such instructions may be read into main memory 906 from another storage medium, such as storage device 910. Execution of the sequences of instructions contained in main memory 906 causes processing device 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 902. Transmission media may also take the form of acoustic or light waves, such as those generated during radio-wave and infra-red data communications.

Various forms of media may be involved in carrying one or more sequences of one or more instructions to processing device 904 for execution. For example, the instructions may initially be carried on a magnetic disk or solid-state drive of a remote computer. The remote computer may load the instructions into its dynamic memory and send the instructions over a network connection. A modem or network interface local to computer system 900 may receive the data.

Bus 902 carries the data to main memory 906, from which processing device 904 retrieves and executes the instructions. The instructions received by main memory 906 may optionally be stored on storage device 910 either before or after execution by processing device 904.

Computer system 900 also includes a communication interface 918 coupled to bus 902. Communication interface 918 provides a two-way data communication coupling to a network link 920 that is connected to a local network 922. For example, communication interface 918 may be a network card, a modem, a cable modem, or a satellite modem to provide a data communication connection to a corresponding type of telephone line or communications line. Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world-wide packet data communication network now commonly referred to as the "Internet" 928. Local network 922 and Internet 928 both use electrical, electromagnetic, or optical signals that carry digital data streams. The signals through the various networks and the signals on network link 920 and through communication interface 918, which carry the digital data to and from computer system 900, are example forms of transmission media.

Computer system 900 may send messages and receive data, including program code, through the network(s), network link 920, and communication interface 918. In the Internet example, a server 930 may transmit a requested code for an application program through the Internet 928, ISP 926, local network 922, and communication interface 918. The received code may be executed by processing device 904 as it is received, and/or stored in storage device 910, or other non-volatile storage for later execution.

Operations of processes described herein may be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processing devices, by hardware or combinations thereof. The code may be stored on a computer-readable storage medium, for example, in the form of a computer program comprising a plurality of instructions executable by one or more processing devices. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or example language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments may be envisioned to one of ordinary skill in the art after reading this disclosure. In other embodiments, combinations or sub-combinations of the above-disclosed invention may be advantageously made. The example arrangements of components are shown for purposes of illustration and combinations, additions, rearrangements, and the like are contemplated in alternative embodiments of the present invention. Thus, while the invention has been described with respect to example embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A method of authenticating a user in providing user access to a computer resource, the method comprising:
 receiving a request for the computer resource from a first user device;
 obtaining, from the first user device, an encrypted persistent cookie responsive to determining that the encrypted persistent cookie is present on the first user device, wherein the encrypted persistent cookie comprises a fingerprint signature field comprising a previous device fingerprint encoded into the fingerprint signature field as part of a previous session;
 obtaining, from the first user device, an Obtained device fingerprint of the first user device;
 comparing, by a processing device, the obtained device fingerprint with the previous device fingerprint of the fingerprint signature field to derive a fingerprint variance representing a difference between the obtained device fingerprint and the previous device fingerprint of the fingerprint signature field; and processing the request for the computer resource based on the fingerprint variance, wherein processing the request for the computer resource based on the fingerprint variance comprises:

identifying a device change based on determining whether the fingerprint variance provides an indication that the encrypted persistent cookie was sourced from a second user device and the obtained device fingerprint is of the first user device that is distinct from the second user device;

responsive to the device change being identified transmitting an authentication request to the first user device;

responsive to the device change not being identified, determining whether the encrypted persistent cookie is valid and is associated with a legitimate user device; and responsive to a determination that the encrypted persistent cookie is valid and is associated with the legitimate user device, providing the first user device access to the computer resource.

2. The method of claim 1, further comprising:
receiving an authentication response to the authentication request;

determining whether the authentication response indicates that the first user device is legitimate;

providing the first user device with an updated encrypted persistent cookie having a fingerprint signature field corresponding to the obtained device fingerprint based on whether the authentication response indicates that the first, user device is legitimate; and blocking access to the computer resource for the first user device if the authentication response indicates that the first user device is not legitimate.

3. The method of claim 2, wherein the indication that the first user device is legitimate is an indication that the first user device is operated by a human user for which the computer resource is being provided and that the first user device is not operated by an automated process posing as the human user or an unauthorized human user.

4. The method of claim 1, wherein the indication that the first user device is legitimate is determined based on a defined set of rules representing expected or normative software and/or hardware changes reflected in the fingerprint variance.

5. The method of claim 1, further comprising:
blocking access to the computer resource responsive to a determination that the encrypted persistent cookie has been obtained more than a threshold number of times within a defined time period.

6. The method of claim 1, wherein the encrypted persistent cookie comprises one or more of device data, geolocation data, a session identification (ID), a cookie encryption ID, a cookie state, a user device domain, a cookie timestamp, a user device intelligence signature, a user device browser a user device operating system ID, and a time-to-live limitation.

7. The method of claim 6, wherein the geolocation data comprises one or more of longitude, latitude, and city name, and wherein the time-to-live limitation is stored as part of the encrypted persistent cookie.

8. The method of claim 1, wherein the fingerprint variance comprises browser version changes, operating system version changes, and/or geolocation of the first user device.

9. The method of claim 1, further comprising clearing the encrypted persistent cookie responsive to an authentication server determining that the first user device is an unauthorized user device.

10. A non-transitory computer-readable storage medium storing instructions, which when executed by a processing device of a computer system; cause the processing device to:

receive a request for a computer resource from a first user device;

obtain, from the first user device, an encrypted persistent cookie responsive to determining that the encrypted persistent cookie is present on the first user device, wherein the encrypted persistent cookie comprises a fingerprint signature field comprising a previous device fingerprint encoded into the fingerprint signature field as part of a previous session;

obtain, from the first user device, an obtained device fingerprint of the first user device;

compare, by the processing device, the obtained device fingerprint with the previous device fingerprint of the fingerprint signature field to derive a fingerprint variance representing a difference between the obtained device fingerprint and the previous device fingerprint of the fingerprint signature field; and process the request for the computer resource based on the fingerprint variance, wherein, to process the request for the computer resource based on the fingerprint variance, the processing device is to:

identify a device change based on determining whether the fingerprint variance provides an indication that the encrypted persistent cookie was sourced from a second user device and the obtained device fingerprint is of the first user device that is distinct from the second user device;

responsive to the device change being identified, transmit an authentication request to the first user device;

responsive to the device change not being identified, determine whether the encrypted persistent cookie is valid and is associated with a legitimate user device; and responsive to a determination that the encrypted persistent cookie is valid and is associated with the legitimate user device, provide the first user device access to the computer resource.

11. The non-transitory computer-readable storage medium of claim 10, wherein the processing device is further to:

receive an authentication response to the authentication request;

determine whether the authentication response indicates that the first user device is legitimate;

provide the first user device with an updated encrypted persistent cookie having a fingerprint signature field corresponding to the obtained device fingerprint based on whether the authentication response indicates that the first user device is legitimate; and block access to the computer resource for the first user device if the authentication response indicates that the first user device is not legitimate.

12. The non-transitory computer-readable storage medium of claim 10, wherein the indication that the first user device is legitimate is determined based on a defined set of rules representing expected or normative software and/or hardware changes reflected in the fingerprint variance.

13. The non-transitory computer-readable storage medium of claim 10, wherein the encrypted persistent cookie comprises one or more of device data, geolocation data, a session identification (ID), a cookie encryption ID, a cookie state, a user device domain, a cookie timestamp, a user device intelligence signature, a user device browser ED, a user device operating system ID, and a time-to-live limitation.

14. The non-transitory computer-readable storage medium of claim 10, wherein the processing device is further to clear the encrypted persistent cookie responsive to an authentication server determining that the first user device is an unauthorized user device.

15. A computer system comprising:
a processing device; and
a storage medium storing instructions, which when executed by the processing device, cause the processing device to:
receive a request for a computer resource from a first user device;
obtain, from the first user device, an encrypted persistent cookie responsive to determining that the encrypted persistent cookie is present on the first user device, wherein the encrypted persistent cookie comprises a fingerprint signature field comprising a previous device fingerprint encoded into the fingerprint signature field as part of a previous session;
obtain, from the first user device, an obtained device fingerprint of the first user device;
compare the obtained device fingerprint with the previous device fingerprint of the fingerprint signature field to derive a fingerprint variance representing a difference between the obtained device fingerprint and the previous device fingerprint of the fingerprint signature field; and
process the request for the computer resource based on the fingerprint, variance, wherein, to process the request for the computer resource based on the fingerprint variance, the processing device is to:
identify a device change based on determining whether the fingerprint variance provides an indication that the encrypted persistent cookie was sourced from a second user device and the Obtained device fingerprint is of the first user device that is distinct from the second user device,
responsive to the device change being identified, transmit an authentication request to the first user device;
responsive to the device change not being identified, determine whether the encrypted persistent cookie is valid and is associated with a legitimate user device; and
responsive to a determination that the encrypted persistent cookie is valid and is associated with the legitimate user device, provide the first user device access to the computer resource.

16. The computer system of claim 15, wherein the processing device is further to:
receive an authentication response to the authentication request;
determine whether the authentication response indicates that the first user device is legitimate;
provide the first user device with an updated encrypted persistent cookie having a fingerprint signature field corresponding to the obtained device fingerprint based on whether the authentication response indicates that the first user device is legitimate; and
block access to the computer resource for the first user device if the authentication response indicates that the first user device is not legitimate.

17. The computer system of claim 15, wherein the encrypted persistent cookie comprises one or more of device data, geolocation data, a session identification (ID), a cookie encryption ID, a cookie state, a user device domain, a cookie timestamp, a user device intelligence signature, a user device browser ID, a user device operating system ID, and a time-to-live limitation.

18. The computer system of claim 15, wherein the indication that the first user device is legitimate is determined based on a defined set of rules representing expected or normative software and/or hardware changes reflected in the fingerprint variance.

19. The computer system of claim 15, wherein the processing device is further to:
block access to the computer resource responsive to a determination that the encrypted persistent cookie has been obtained more than a threshold number of times within a defined time period.

20. The computer system of claim 15, wherein the processing device is further to clear the encrypted persistent cookie responsive to an authentication server determining that the first user device is an unauthorized user device.

* * * * *